US012717873B1

(12) United States Patent
Shamieh et al.

(10) Patent No.: US 12,717,873 B1
(45) Date of Patent: Aug. 25, 2026

(54) FULLY ANALOG COMPUTE-IN-MEMORY ARCHITECTURE FOR NEURAL NETWORKS

(71) Applicant: Georgia Tech Research Corporation, Atlanta, GA (US)

(72) Inventors: Laith A. Shamieh, Charlotte, NC (US); Saibal Mukhopadhyay, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 19/291,042

(22) Filed: Aug. 5, 2025

(51) Int. Cl.
*G06F 17/16* (2006.01)

(52) U.S. Cl.
CPC .................................... *G06F 17/16* (2013.01)

(58) Field of Classification Search
CPC ............ G06N 3/04; G06N 3/06; G06N 3/063; G06N 3/065; G06N 3/08; G06N 3/044; G06N 3/0499; G06N 3/0464; G06N 3/0442; G06N 3/0475; G06N 3/0495; G06N 3/047; G06N 3/0895; G06N 3/09; G06N 3/091; G06N 3/092; G06N 3/094; G06N 3/096; G06N 3/098; G06N 3/0985;
(Continued)

(56) References Cited

U.S. PATENT DOCUMENTS 4,947,482 A * 8/1990 Brown ..................... G06N 3/04 708/801
10,167,800 B1 * 1/2019 Chung ............... G05B 23/0254
(Continued)

OTHER PUBLICATIONS

R. Wojtyna, "Low-voltage quasi-linear current-to-voltage converter for analog signal processing," 2016 MIXDES—23rd International Conference Mixed Design of Integrated Circuits and Systems, Lodz, Poland, 2016, pp. 405-409 (Year: 2016).*
(Continued)

*Primary Examiner* — Andrew Caldwell
*Assistant Examiner* — Huy Duong
(74) *Attorney, Agent, or Firm* — Perilla Knox & Hildebrandt LLP; Jonathan A. Paulis

(57) ABSTRACT

A Fully Analog STate-Space Compute-In-Memory (FAST-CIM) architecture implements cascaded CIM arrays that maintain continuous analog signal flow throughout neural network computations. Sequential data patches are processed through cascaded CIM arrays, where a feedforward CIM array performs initial vector-matrix multiplication using analog computations within memory cells, and the analog output flows directly through a gain circuit to a recurrent CIM array without digital conversion. The gain circuit converts analog current signals to voltage signals, enabling direct analog connection between the cascaded arrays. The recurrent CIM array executes State-Space Model (SSM) computations, processing the cascaded analog signals along with previous state information maintained by a State Write and Propagate (SWAP) circuit that stores states using capacitive elements. The cascaded array configuration eliminates analog-to-digital and digital-to-analog converters between processing stages, achieving reduced power consumption and latency compared to conventional implementations that require digital interfaces between CIM arrays.

18 Claims, 7 Drawing Sheets

(58) Field of Classification Search
CPC ..... G06G 7/00–46; G06F 17/10; G06F 17/11; G06F 17/12; G06F 17/15–153; G06F 15/7821; G06F 15/785
See application file for complete search history.

(56) References Cited

U.S. PATENT DOCUMENTS

| | | | | |
|---|---|---|---|---|
| 2014/0172937 | A1* | 6/2014 | Linderman | G06G 7/16 708/607 |
| 2015/0170025 | A1* | 6/2015 | Wu | G06N 3/065 706/25 |
| 2021/0334335 | A1* | 10/2021 | Kodavanji | G06F 16/2255 |
| 2023/0259748 | A1* | 8/2023 | Chettuvetty | G11C 11/54 706/29 |

OTHER PUBLICATIONS

Dang, Trung Dinh Quoc, et al. “Log-Vmamba: Local-Global Vision Mamba for Medical Image Segmentation.” arXiv.Org, Aug. 26, 2024, arxiv.org/abs/2408.14415. (Year: 2024).*

C. Zhao, J. Fang, J. Jiang, X. Xue and X. Zeng, “Light-CIM: A Lightweight ADC/DAC-Fewer RRAM CIM DNN Accelerator With Fully Analog Tiles and Nonideality-Aware Algorithm for Consumer Electronics,” in IEEE, vol. 44, No. 2, pp. 602-612, Feb. 2025 (Year: 2025).*

A. Gu and T. Dao, “Linear-Time Sequence Modeling with Selective State Spaces,” in Conference on Language Modeling (COLM), 2024. pp. 1-32.

A. Gu, K. Goel, and C. Ré, “Efficiently Modeling Long Sequences with Structured State Spaces,” arXiv preprint arXiv:2111.00396, 2022.pp. 1-32.

A. Guo et al., “A 22nm 64kb Lightning-Like Hybrid Computing-in-Memory Macro with a Compressed Adder Tree and Analog-Storage Quantizers for Transformer and CNNs,” in IEEE International Solid-State Circuits Conference (ISSCC), 2024. pp. 1-3.

A. Wang, H. Shao, S. Ma, and Z. Wang, “FastMamba: A High-Speed and Efficient Mamba Accelerator on FPGA with Accurate Quantization,” School of Electronic Science and Engineering, Nanjing University, 2024. pp. 1-6.

B. Liu, X. Xu, Y. Zhang, X. Kang, Q. Wei, Z. Zou, J. Yang, H. Cai, and X. Si, “A 52.03 TOPS/W DCIM-Based Accelerator with FlashAttention and Sparsity-Aware Alignment for LLMs,” in IEEE Custom Integrated Circuits Conference (CICC), 2025. pp. 1-3.

E. Kim, H. Oh, J. Lee, J. Park, M. Kwon, and J.-J. Kim, “A 10T2C Capacitive SRAM-Based Computing-In-Memory Macro with Array-Embedded DAC and Shift-and-Add Functions,” in IEEE Custom Integrated Circuits Conference (CICC), 2024. pp. 1-2.

Huang, Tao; Pei, Xiaohuan; You, Shan; Wang, Fei; Qian, Chen; Xu, Chang, “LocalMamba: Visual State Space Model with Windowed Selective Scan,” arXiv preprint arXiv:2403.09338, Mar. 14, 2024. pp. 1-20.

J. Li, S. Huang, J. Xu, J. Liu, L. Ding, N. Xu, and G. Dai, “MARCA: Mamba Accelerator with Reconfigurable Architecture,” in Proceedings of the 43rd IEEE/ACM International Conference on Computer-Aided Design (ICCAD ’24), New York, NY, USA, Oct. 27-31, 2024. pp. 1-10.

J. T. H. Smith, A. Warrington, and S. W. Linderman, “Simplified State Space Layers for Sequence Modeling,” in International Conference on Learning Representations (ICLR), 2023. pp. 1-35.

R. Wojtyna, “Upgraded Low Voltage Analog Current-to-Voltage Converter with Negative Feedback,” in Analog Signal Processing Research, 2024. pp. 80-84.

S. Sharma, W.-C. Wang, C. DeLude, M. Lee, N. M. Rahman, N. V. Kidambi, J. Romberg, and S. Mukhopadhyay, “AFE-CIM: A Current-Domain Compute-In-Memory Macro for Analog-to-Feature Extraction,” Georgia Institute of Technology, 2024. pp. 33-35.

W.-C. Wang, S. Zhang, L. Shamieh, N. V. Kidambi, I. Chakraborty, and S. Mukhopadhyay, “MIX-ACIM: A 28-nm Mixed-Precision Analog Compute-in-Memory With Digital Feature Restoration for Vector-Matrix Multiplication,” IEEE Solid-State Circuits Letters, vol. 8, pp. 213-216, 2025.

X. Hu, H. Mun, J. Meng, Y. Liao, A. Sridharan, and J.-S. Seo, “A 28nm 20.9-137.2 TOPS/W Output-Stationary SRAM Compute-in-Memory Macro Featuring Dynamic Look-ahead Zero Weight Skipping and Runtime Partial Sum Quantization,” in IEEE Custom Integrated Circuits Conference (CICC), 2025. pp. 1-3.

Jouppi, Norman P.; Young, Cliff; Patil, Nishant P.; Patterson, David A.; Agrawal, Gaurav, Bajwa, Raminder; et al., “In-Datacenter Performance Analysis of a Tensor Processing Unit,” Proceedings of the 44th Annual International Symposium on Computer Architecture (ISCA), Toronto, Canada, Jun. 24-28, 2017, pp. 1-12.

Kneip, Adrian; Lefebvre, Martin; Verecken, Julien; and Bol, David, “Impact: A 1-to-4b 813-TOPS/W 22-nm FD-SOI Compute-in-Memory CNN Accelerator Featuring a 4.2-POPS/W 146-TOPS/mm$^2$ CIM-SRAM With Multi-Bit Analog Batch-Normalization,” IEEE Journal of Solid-State Circuits, vol. 58, No. 7, Jul. 2023. pp. 1871-1884.

Lee, Chia-Fu; Lu, Cheng-Han; Lee, Cheng-En; Mori, Haruki; Fujiwara, Hidehiro; Shih, Yi-Chun; Chou, Tan-Li; Chih, Yu-Der; and Chang, Tsung-Yung Jonathan, “A 12nm 121-TOPS/W 41.6-TOPS/mm$^2$ All Digital Full Precision SRAM-based Compute-in-Memory With Configurable Bit-width for AI Edge Applications,” TSMC Technical Paper, 2023. pp. 24-25.

Schuiki, Fabian; Schaffner, Michael; Gurkaynak, Frank K.; and Benini, Luca, “A Scalable Near-Memory Architecture for Training Deep Neural Networks on Large In-Memory Datasets,” IEEE Transactions on Computers, vol. 68, No. 4, Apr. 2019, pp. 484-497.

Sehgal, Rishabh; Thareja, Tanmay; Xie, Shanshan; Ni, Can; and Kulkarni, Jaydeep P., “A Bit-Serial, Compute-in-SRAM Design Featuring Hybrid-Integrating ADCs and Input Dependent Binary Scaled Precharge Eliminating DACs for Energy-Efficient DNN Inference,” IEEE Journal of Solid-State Circuits, vol. 58, No. 7, Jul. 2023. pp. 2109-2124.

Vaswani, Ashish; Shazeer, Noam; Parmar, Niki; Uszkoreit, Jakob; Jones, Llion; Gomez, Aidan N.; Kaiser, Łukasz; and Polosukhin, Illia, “Attention Is All You Need,” Advances in Neural Information Processing Systems (NeurIPS), 2017. pp 1-11.

Wang, Hechen; Liu, Renzhi; Dorrance, Richard; Dasalukunte, Deepak; Liu, Xiaosen; Lake, Dan; Carlton, Brent; and Wu, May, “A 32.2 Tops/W SRAM Compute-in-Memory Macro Employing a Linear 8-bit C-2C Ladder for Charge Domain Computation in 22nm for Edge Inference,” Intel Labs Technical Paper, 2022. pp. 36-37.

* cited by examiner

600B

| | FULLY DIGITAL | ACIM WITH DIGITIZATION | FAST-CIM |
|---|---|---|---|
| AREA ($MM^2$) | 4.9 | 4.5 | 4.11 |
| POWER (W) | 4.81 | 1.6 | .685 |
| LATENCY (NS) | 468 | 65 | 13.8 |
| EFFICIENCY (TOPS/W) | --- | 20.6-39.6 | 268 |

*FIG. 6B*

FULLY ANALOG COMPUTE-IN-MEMORY ARCHITECTURE FOR NEURAL NETWORKS

FEDERALLY SPONSORED RESEARCH OR DEVELOPMENT

This invention was made with government support under award number HR001124C0312 by the U.S. Department of Defense (DOD)/Defense Advanced Research Projects Agency (DARPA). The government has certain rights in the invention.

BACKGROUND

The rapid growth of artificial intelligence and machine learning applications has created substantial demand for efficient neural network processing architectures. Modern deep learning models can require extensive computational resources, particularly for vector-matrix multiplications (VMMs) that form the core operations in neural networks. Traditional digital computing architectures face limitations in supporting these workloads due to the constant movement of data between memory and processing units, known as the von Neumann bottleneck. This data movement results in high power consumption, increased latency, and limits the scalability of neural network implementations.

Compute-In-Memory (CIM) architectures have emerged as a promising solution to address these limitations by performing computations directly within memory arrays. CIM reduces data movement overhead and improves energy efficiency by leveraging the inherent parallelism of memory structures. Analog CIM (ACIM) implementations can particularly benefit from the ability to perform vector-matrix multiplications using the physical properties of memory cells, enabling high computational throughput with reduced power consumption.

Despite the advantages of CIM architectures, existing implementations face scalability challenges when deployed with conventional neural network architectures such as Convolutional Neural Networks (CNNs) and Transformers. These architectures typically require significant intermediate storage, complex data dependencies, and frequent inter-layer computations, which are not well suited to the in-place processing model of CIM. In analog CIM (ACIM) systems, these requirements necessitate repeated conversions between analog and digital domains. The use of analog-to-digital converters (ADCs) and digital-to-analog converters (DACs) between computational layers introduces significant power and area overhead, limiting the efficiency gains that CIM architectures can provide.

State-Space Models (SSMs) represent a class of neural network architectures that model dynamic systems through state transitions influenced by external inputs. Originally developed for control systems, SSMs have been adapted for sequence modeling tasks and offer linear computational complexity in both time and space, contrasting with the quadratic complexity of many contemporary neural architectures.

Current neural network accelerator designs have primarily focused on optimizing existing CNN and Transformer architectures for CIM implementations. These implementations often encounter bottlenecks related to the architectural characteristics of these models, including variable feature map sizes, frequent memory access to intermediate data, and irregular data flow patterns caused by skip connections or attention mechanisms, which may not align optimally with the localized and parallel processing model of CIM.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 6B depicts a performance comparison table quantifying area, power, latency, and efficiency metrics for the architectures shown in FIG. 6A according to various aspects of the present disclosure.

DETAILED DESCRIPTION

Figure 1:
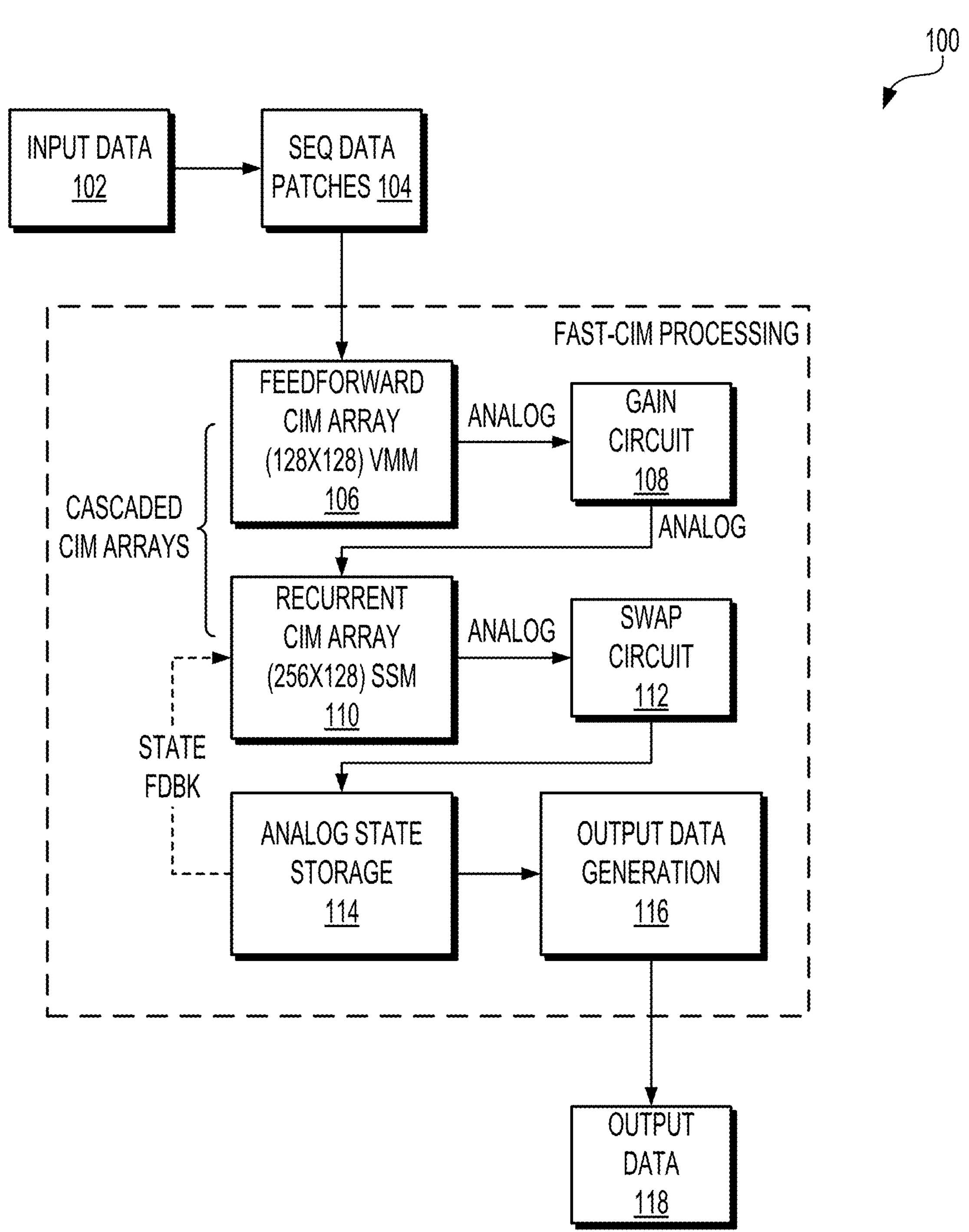
FIG. 1 depicts a block diagram of a Fully Analog STate-Space Compute-In-Memory (FAST-CIM) architecture according to various aspects of the present disclosure.

Modern artificial intelligence and machine learning applications can demand increasingly powerful neural network processing capabilities, particularly for computer vision, natural language processing, and time-series analysis tasks. These applications rely heavily on vector-matrix multiplication (VMM) operations, which constitute the fundamental computational kernel in neural networks. As neural network models grow in size and complexity, with some models containing billions of parameters, the computational requirements for training and inference have increased exponentially. Traditional digital computing architectures face fundamental limitations in meeting these demands due to the von Neumann bottleneck, where the physical separation of memory and processing units necessitates continuous data movement that dominates power consumption and limits performance.

The von Neumann bottleneck manifests as a critical constraint in neural network processing, where up to 90% of energy consumption may be attributed to data movement rather than actual computation. In conventional digital architectures, weight data must be fetched from memory, transported to arithmetic logic units, processed, and then written back to memory for each operation. This data movement occurs across multiple levels of memory hierarchy, from main memory to cache to registers, with each transfer consuming significant energy and introducing latency. For large neural networks processing high-resolution images or long sequences, the energy cost of data movement may exceed 200 picojoules per operation, while the actual arithmetic operation may require less than 1 picojoule.

Compute-In-Memory (CIM) architectures have emerged as a promising approach to address the von Neumann bottleneck by performing computations directly within memory arrays. CIM architectures leverage the physical properties of memory cells to perform analog computations in parallel, eliminating the need to move data between separate memory and processing units. Analog CIM (ACIM) implementations particularly benefit from the inherent parallelism of crossbar arrays, where an entire vector-matrix multiplication can be performed in a single operation by applying voltages to word lines and reading currents from bit lines. This approach may achieve orders of magnitude improvements in energy efficiency compared to digital architectures.

However, existing CIM implementations face significant challenges when deployed with contemporary neural network architectures. Convolutional Neural Networks (CNNs) may require large intermediate feature maps that should be frequently read and written across layers, and often include skip connections that increase data movement, all of which may not align with the fixed dimensions and data locality constraints of CIM arrays. Transformer architectures demand quadratic computational complexity for attention mechanisms and require storing large key-value matrices that may exceed typical CIM array capacities. These architectural mismatches result in underutilization of CIM arrays and necessitate substantial data reorganization between layers, while in ACIM, these architectural mismatches further highlight the need for frequent digitization of intermediate values to support inter-layer communication and residual connections.

A critical limitation of current ACIM implementations involves the interface between analog and digital domains. While ACIM arrays perform efficient analog computations, most existing approaches require analog-to-digital converters (ADCs) and digital-to-analog converters (DACs) between processing layers to maintain compatibility with digital systems. These converters introduce substantial overhead in terms of power consumption, silicon area, and latency. High-resolution ADCs capable of preserving neural network accuracy can consume 50-200 milliwatts each and occupy significant chip area. For a typical ACIM accelerator with multiple arrays, the ADC/DAC overhead may account for 60-80% of total system power consumption, largely negating the efficiency advantages of analog computation.

Previous attempts to address these limitations have followed several approaches. Some implementations use lower-resolution ADCs and DACs to reduce overhead but suffer from accuracy degradation that limits their applicability to complex neural networks. Other approaches implement partial analog processing within layers but still require digital conversion for inter-layer communication. Hybrid digital-analog architectures attempt to balance efficiency and flexibility but introduce complex control logic and synchronization challenges. These solutions provide incremental improvements but may not fully realize the potential of analog computation for neural network processing.

Accordingly, there remains a need for neural network architectures and processing systems that can fully leverage the advantages of ACIM while minimizing or eliminating the overhead associated with analog-to-digital conversions. Such architectures would ideally maintain consistent computational patterns that align with CIM array structures while supporting the complex operations required by modern neural networks.

In some implementations, present disclosure provides a Fully Analog STate-Space Compute-In-Memory (FAST-CIM) architecture that maintains continuous analog signal flow throughout the entire neural network computation pipeline. The FAST-CIM architecture can implement cascaded CIM arrays using State-Space Models (SSMs) in combination with specific analog circuit components that enable direct array-to-array analog signal propagation. SSMs model dynamic systems through state transitions described by linear differential equations, and when implemented in the FAST-CIM architecture disclosed herein, enable cascading of multiple CIM blocks without intermediate digital conversion. The cascaded configuration is achieved through several technical features, including consistent feature map sizes across layers, linear computational complexity in both time and space that enables predictable scaling, and reduced intermediate storage requirements that eliminate external memory buffers between cascaded stages.

In some implementations, the FAST-CIM architecture includes several innovative components that enable continuous analog processing. These components enable cascaded operation of multiple CIM arrays without intermediate digital conversion. For example, in one implementation, a feedforward CIM array performs initial vector-matrix multiplications on input data using analog computations within 8T-SRAM cells. A gain circuit converts analog current outputs to analog voltage signals using quasi-linear current-to-voltage conversion, maintaining signal integrity without digital conversion. A recurrent CIM array implements state-space model computations, processing both current inputs and previous state information in the analog domain. A State Write And Propagate (SWAP) circuit manages analog state storage using capacitive elements and provides state feedback without requiring digital registers or conversion operations.

The continuous analog signal flow in FAST-CIM eliminates the ADC/DAC overhead that constrains traditional CIM implementations. By maintaining signals in the analog domain from input to output, the architecture avoids the power consumption, area overhead, and latency associated with repeated analog-to-digital conversions. This enables direct cascading of the feedforward CIM array to other feedforward CIM arrays or to the recurrent CIM array depending on the operation, eliminating external memory buffers and data reorganization typically required between processing stages. The analog state storage mechanism enables temporal processing required for sequence modeling while preserving the efficiency benefits of analog computation. The architecture processes input data as sequential patches, enabling scalable handling of large inputs while maintaining consistent computational efficiency through the cascaded CIM blocks.

The FAST-CIM architecture can achieve substantial improvements across multiple performance metrics compared to existing solutions. For example, in some tests, power consumption was reduced to 0.685 W for a complete Local Vision Mamba (LocalVim) block implementation (a neural network block implementing local vision processing with SSM dynamics), representing an 86% reduction compared to fully digital architectures and a 57% reduction compared to analog CIM with digitization. Processing latency was reduced to 13.8 nanoseconds, representing a 97% improvement over digital implementations and a 79% improvement over hybrid approaches. The FAST-CIM architecture also achieved computational efficiency of 268 TOPS/W and computational density of 212 TOPS/mm$^2$ in 28 nm CMOS technology, exceeding the efficiency of existing CIM implementations by 6-13×.

The cascaded FAST-CIM implementation leverages SSM architectural characteristics to achieve additional advantages. The consistent feature map sizes in SSMs enable direct cascading of CIM arrays, eliminating the need for complex data reorganization between layers. The linear computational complexity enables processing of longer sequences and larger images without the exponential scaling penalties of attention-based architectures. The state-based formulation supports temporal processing for video analysis, time-series prediction, and sequential decision-making tasks. These architectural advantages, combined with the continuous analog processing approach through cascaded CIM arrays, enable FAST-CIM to achieve state-of-the-art accuracy on standard benchmarks while dramatically reducing power consumption and latency.

The FAST-CIM architecture represents a fundamental advancement in neural network acceleration by demonstrating that end-to-end analog processing is both feasible and advantageous for practical applications. The combination of architectural innovation (SSMs) with circuit-level optimization (continuous analog flow) enables cascaded CIM blocks that process data sequentially without digital interfaces, providing a path toward ultra-efficient neural network processing that can enable new applications in power-constrained edge devices, real-time systems, and large-scale data centers. The following detailed description presents the specific implementations, circuit designs, and operational methods that realize these advantages.

While the following description presents specific implementations using particular circuit configurations and neural network architectures, those skilled in the art will appreciate that the principles disclosed herein may be applied to various memory technologies, circuit designs, and neural network configurations. The specific examples are provided for illustration and should not be construed as limiting the scope of the disclosed technology.

FIG. 1 depicts a block diagram of a FAST-CIM architecture 100 according to various aspects of the present disclosure. The FAST-CIM architecture 100 shown in FIG. 1 illustrates an overall system configuration and data flow for processing neural network computations using SSMs with continuous analog signal processing through a FAST-CIM implementation. The FAST-CIM architecture 100 implements a cascaded configuration where analog signals flow sequentially through multiple CIM arrays without intermediate digital conversion.

The FAST-CIM architecture 100 receives input data 102, which may include image data, video data, sensor data, time-series data, or other types of multi-dimensional information suitable for neural network processing using SSMs. The input data 102 may include any data that benefits from sequential processing and temporal modeling. Examples of suitable input data 102 include image data such as ImageNet-1K images or CIFAR-10 color images for classification tasks, video sequences for temporal analysis, sensor readings for signal processing, or other structured data that can be divided into sequential components.

The input data 102 is divided into sequential data patches 104 for processing. When the input data 102 includes image data, the input data 102 is partitioned into sequential data patches 104 having predetermined spatial dimensions, such as 16×16×3 patches indicating the red/green/blue (RGB) color channels, where each patch size corresponds to specific requirements of the LocalVim architecture.

LocalVim represents an advanced vision architecture that uses structured SSMs to efficiently process images by dividing input images into sequential patches and processing the patches sequentially within smaller windows to minimize memory requirements. The LocalVim architecture includes LocalVim blocks that contain fully connected/linear layer, convolution operations, SSM blocks, and spatial and channel attention modules (SCAttn), with each LocalVim block processing sequential data patches in multiple scanning directions. The fully connected layers, convolution operations, SSM blocks, and spatial and channel attention modules within each LocalVim block can be implemented using the FAST-CIM feedforward CIM arrays 106 and the recurrent CIM arrays 110, enabling continuous analog processing throughout the LocalVim architecture while maintaining the linear computational complexity advantages of state-space model formulations. For ImageNet-1K processing, up to 196 sequential data patches 104 can be generated for processing by the task head, while CIFAR-10 processing may utilize 4 sequential data patches 104 for final classification.

The sequential data patches 104 are processed through a FAST-CIM processing region that maintains analog signal continuity throughout the computational pipeline. The FAST-CIM processing region includes multiple interconnected components that perform vector-matrix multiplication (VMM) operations and SSM computations using analog signals directly within memory arrays, eliminating the need for analog-to-digital converters (ADCs) and digital-to-analog converters (DACs) between computational layers that are required in traditional Analog CIM with Digitization (ACIM-Dig).

The cascaded CIM arrays configuration represents a key technical achievement of the FAST-CIM architecture 100. A feedforward CIM array 106 and a recurrent CIM array 110 are arranged in a cascaded configuration where the analog output from the feedforward CIM array 106 flows directly through a gain circuit 108 to become the analog input of the recurrent CIM array 110. This cascading eliminates the ADCs and DACs that would traditionally be required between CIM arrays. The "ANALOG" labels on the signal paths between components emphasize that signals remain in the analog domain throughout the cascaded processing pipeline.

As the first stage in the cascaded configuration, the feedforward CIM array 106 receives the sequential data patches 104 and performs VMM operations using analog computations directly within memory cells. The feedforward CIM array 106 applies an analog vector $v_{in}$ to analog word-lines (A-WL) in an array for VMM operation $y_{out}=W^T \cdot v_{in}$, where W represents the stored weight matrix and $v_{in}$ represents the input vector. In one non-limiting example implementation, the feedforward CIM array 106 includes a 128×128 matrix configuration of memory cells, which may be implemented using 8-transistor static random access memory (8T-SRAM) cells that store weight data and perform multiplication operations using current accumulation along read paths weighted by stored weight values. In this implementation, the 8T-SRAM cells include separate read paths and write paths, where the analog computations are performed using current accumulation along the 2T read path, with the resulting current accumulated in analog read bit lines (A-RBL). The feedforward CIM array 106 operates on analog word-lines (A-WL) that receive analog voltage inputs and generates analog current signals as output from the vector-matrix multiplication operations through A-RBL.

The resulting currents are weighted by bit significance and processed through a Weighted Current Accumulator (WCA) that accumulates the weighted currents to produce the final VMM result. The WCA output is converted to voltage by a gain circuit 108 for continuous analog integration between cascaded layers, eliminating the need for digital conversion operations that would be required in traditional CIM implementations.

The analog current signals from the feedforward CIM array 106 are provided to the gain circuit 108 that converts the analog current signals to analog voltage signals while maintaining continuous analog signal flow. The gain circuit 108 may include one or more current-to-voltage conversion circuits that implement quasi-linear conversion elements operating in a triode region to provide enhanced linearity for the analog voltage signals. The gain circuit 108 may include a nonlinear resistor formed by transistors operating in the triode region where the Drain-to-Source voltage ($V_{DS}$) is less than the Gate-to-Source voltage ($V_{GS}$) minus the threshold voltage ($V_{th}$) (i.e., $V_{DS}<V_{GS}-V_{th}$) to enhance linearity and optimize low-power operation. The gain circuit 108 further includes a high-precision voltage follower that stabilizes the output voltage using a negative feedback loop, achieving low output impedance according to the gain equation $$R_{of} = \frac{R_o}{(\delta_{ds1} + \delta_{ds2} + A\beta)},$$

where $A\beta$ represents the loop gain.

The converted analog voltage signals from the gain circuit 108 are provided as analog signals to the recurrent CIM array 110. As the second stage in the cascaded configuration, the recurrent CIM array 110 serves as the building block of the SSM within each LocalVim block and uses past state data combined with new inputs to compute current states dynamically according to the recurrent network model that updates each state $h_p(i)$ based on a linear combination of the previous state $h_p(i-1)$ and the new input $x_p(i)$, described by $h_p(i)=A\cdot h_p(i-1)+B\cdot x_p(i)$, where A and B are matrices that define the system dynamics.

The recurrent CIM array 110 performs SSM computations on the sequential data patches 104, where the SSM computations implement state transitions described by the discrete-time equation: $h_{t+1}=A_d\cdot h_t+B_d\cdot x_t$, where $A_d=e^{A\Delta t}$ and $B_d=(A^{-1}(e^{A\Delta t}-1))B$ represent discretized state-space parameters, $h_t$ represents the hidden state at time t, $x^t$ represents the input at time t, and $h_{t+1}$ represents the updated state. Following the state update computation in the recurrent CIM array 110, the updated state $h_{t+1}$ is provided to the feedforward CIM array 106 for operations that implement the SSM output equation $y_t=C\cdot h_t$, where C represents the output weight matrix and y represents the final output at time t.

The state $h_p(i-1)$ is retained in memory for a duration $\Delta t$ between updates to ensure continuity in state evolution. The recurrent CIM array 110 may have a different matrix dimension configuration than the feedforward CIM array 106, such as a 256×128 matrix configuration with 4-bit weight elements stored within an SRAM array, to accommodate the computational requirements of the SSM operations and sequential feature storage. The different dimensions between the cascaded arrays (128×128 for feedforward and 256×128 for recurrent) are accommodated by the consistent feature map processing of the SSM architecture, enabling direct analog connection without data reorganization. The cascaded configuration enables the complete SSM implementation through the combination of recurrent CIM array 110 for state evolution and feedforward CIM array 106 for output generation, providing the mathematical foundation for the state-space computations that enable linear computational complexity in both time and space. The recurrent CIM array 110 supports both the recurrent state input ($h_{t-1}$) and the new analog input ($x_t$) after the multiply-and-accumulate (MAC) operation, enabling the cascaded array configuration for efficient sequential processing.

A State Write And Propagate (SWAP) circuit 112 is coupled to the recurrent CIM array 110 and manages the storage and updating of state information in analog form. The SWAP circuit 112 may include one or more state management circuits that write new state data and propagate the new state data as feedback for subsequent processing operations. The SWAP circuit 112 can operate synchronously with a clock signal to store output voltage from each column in the matrix on capacitors representing the new state. The new state is then mirrored and stored as the previous state, which is fed back into the array using a voltage follower circuit similar to the voltage follower in the gain circuit 108. The SWAP circuit 112 enables the system to maintain state continuity between sequential processing operations while preserving the analog nature of the signals and eliminating the need for digital state storage registers that would be required in traditional digital implementations.

An analog state storage 114 stores the state information in analog form within the FAST-CIM processing region between sequential processing operations. The analog state storage 114 includes analog storage capacitors and mirroring circuits that store updated state information and provide the stored state information as feedback signals for recurrent processing operations. The analog state storage 114 maintains a feedback path (labeled "STATE FDBK") that provides previous state data back to the recurrent CIM array 110 for use in subsequent SSM computations. The state information is retained in analog form for a duration $\Delta t$ between updates to ensure continuity in state evolution, where $\Delta t$ represents the time interval between sequential patch processing operations. The analog state storage 114 eliminates the need for 8-bit registers that would be required in ACIM-Dig implementations, thereby reducing power consumption and area overhead.

An output data generation module 116 receives processed signals from the analog state storage 114 and generates output data 118 based on the processed sequential data patches. The output data generation module 116 performs final classification, detection, or other processing tasks based on the accumulated results from the state-space model computations performed on the sequential data patches. In implementations using the LocalVim architecture, the output data generation module 116 may implement a task head that performs classification operations on the temporally combined features generated by processing all sequential patches through the FAST-CIM system. The output data generation module 116 can achieve classification accuracies, for example, up to 74.3% for ImageNet-1K datasets and 96.29% for CIFAR-10 datasets when using the LocalVim-T architecture with approximately 8M parameters.

The FAST-CIM architecture 100 shown in FIG. 1 maintains analog signal flow between the feedforward CIM array 106 and the recurrent CIM array 110 during processing of the sequential data patches 104, thereby eliminating the need for ADCs and DACs between computational layers that consume significant power in traditional implementations.

This continuous analog processing approach provides substantial improvements in compute efficiency, achieving up to 268 Terra Operations Per Second (TOPS) per watt (TOPS/W) and 212 TOPS/$mm^2$ in 28 nm Complementary Metal-Oxide-Semiconductor CMOS technology, compared to ACIM-Dig implementations that achieve only about 20.6-39.6 TOPS/W due to the overhead of ADCs and DACs between layers. The FAST-CIM architecture 100 also reduces total power consumption from 634.7-661.7 mW in ACIM-Dig implementations to 197.1-207.2 mW, representing a power reduction of approximately 70% while maintaining comparable computational throughput.

The sequential processing of data patches through the system allows for efficient handling of large input datasets while maintaining consistent computational throughput. The SSM approach provides linear computational complexity in both time and space, enabling scalable processing of neural network operations using the analog compute-in-memory architecture. The system can process sequential patches with latency as low as 13.8 nanoseconds for the complete Local-Vim block compared to 65 nanoseconds for ACIM-Dig implementations and 468 nanoseconds for fully digital implementations, demonstrating the significant performance advantages of the FAST-CIM approach.

While FIG. 1 illustrates cascading of two CIM arrays (feedforward and recurrent), the FAST-CIM architecture 100 can support cascading of additional arrays for deeper neural networks. Each additional cascaded stage maintains analog signal continuity through appropriate gain circuits and signal conditioning, enabling scaling to arbitrary network depths while preserving the efficiency advantages.

Figure 2:
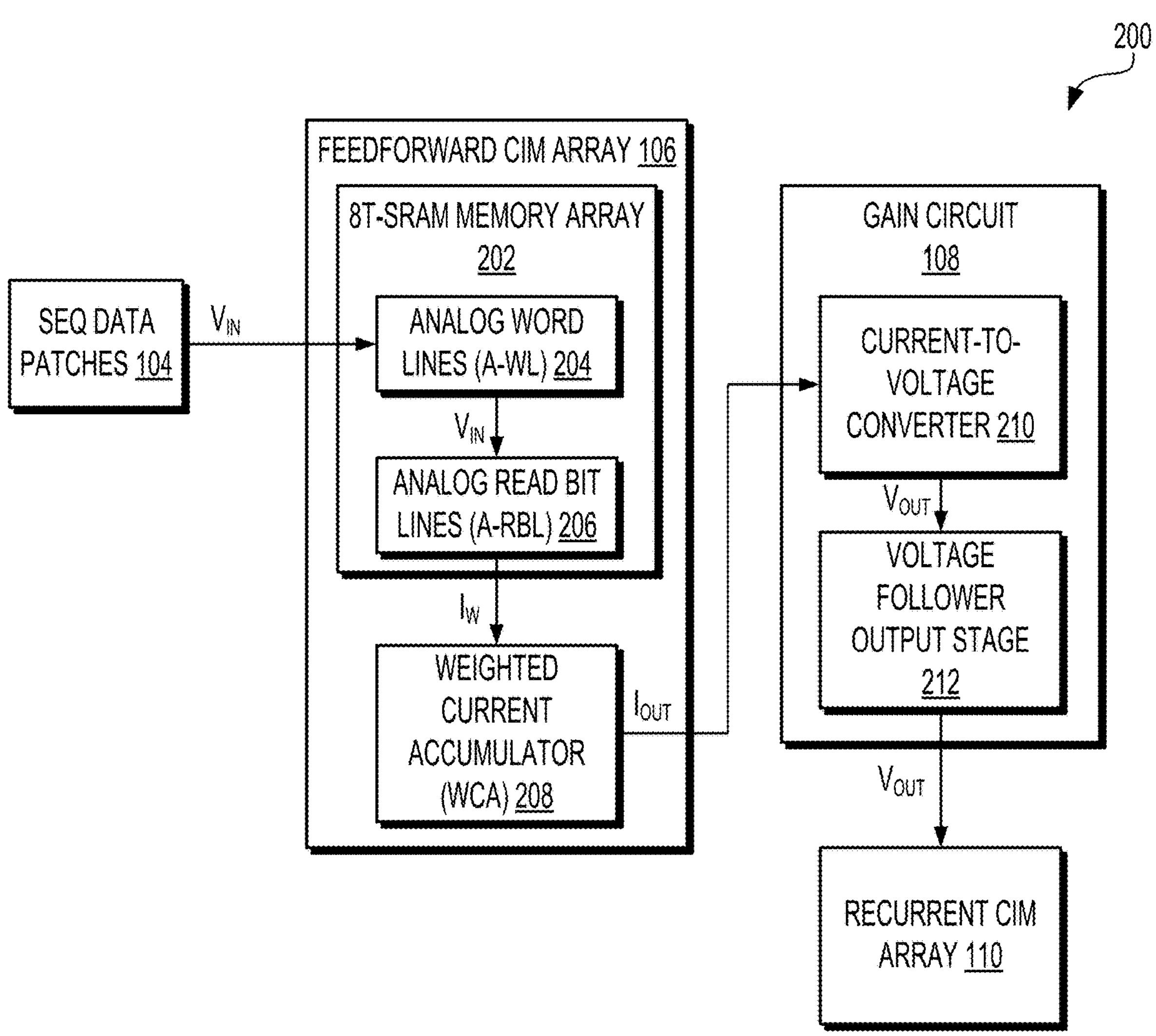
FIG. 2 depicts a detailed circuit diagram of a feedforward CIM array with a gain circuit according to various aspects of the present disclosure.

FIG. 2 depicts a feedforward processing circuit 200 of the feedforward CIM array 106 with the gain circuit 108 according to various aspects of the present disclosure. The feedforward processing circuit 200 shown in FIG. 2 illustrates the internal components and signal processing flow within the feedforward CIM array 106 from FIG. 1.

The feedforward CIM array 106 receives the sequential data patches 104 as input, which may include digitally formatted data that has been partitioned from the original input data 102. The sequential data patches 104 may include image patches having predetermined spatial dimensions, such as 16×16×3 patches for RGB image data, or other structured data formats suitable for processing by SSM architectures. The sequential data patches 104 are provided to the feedforward CIM array 106 for analog processing.

The feedforward CIM array 106 includes multiple interconnected components that perform the core VMM operations using analog signals. An 8T-SRAM memory array 202 includes the primary memory component of the feedforward CIM array 106 and stores weight data in a 128×128 matrix configuration, although other configurations are contemplated. The 8T-SRAM memory array 202 includes integrated analog word lines (A-WL) 204 that receive input voltages $v_{in}$ from the sequential data patches 104, and analog read bit lines (A-RBL) 206 that collect the resulting weighted currents. Each memory cell in the 8T-SRAM memory array 202 can store 4-bit precision weight values that represent the learned parameters of the neural network model.

The 8T-SRAM memory array 202 implements 8T-SRAM memory cells that include separate read paths and write paths, where the read paths enable analog computations while the write paths allow for weight updates during training or configuration. Each memory cell in the 8T-SRAM memory array 202 may store weight values that are accessed during the VMM operation $y_{out}=W^T \cdot v_{in}$, where W represents the stored weight matrix, $v_{in}$ represents the input vector derived from the sequential data patches 104 and applied as analog voltages to word lines, and $y_{out}$ represents the analog output vector produced by the accumulation and processing of currents from the bit lines.

The analog word lines 204, integrated within the 8T-SRAM memory array 202, receive the sequential data patches 104 as analog voltage signals ($v_{in}$). The analog voltage signals are applied directly to the analog word lines 204 within the 8T-SRAM memory array 202, activating the two-transistor (2T) read path within each 8T-SRAM memory cells. In this path, input voltage ($v_{in}$) is applied to one transistor, while the other is controlled by the stored weight/bit. When activated, current flows through each memory cell proportional to both the applied word line voltage and the stored weight value, effectively performing multiplication in the analog domain. The analog word lines 204 may include 128 separate word lines corresponding to the input dimensions, where each word line carries a specific analog voltage level that represents a component of the input voltage $v_{in}$. The analog voltage levels applied to the analog word lines 204 may range within operational limits suitable for the 8T-SRAM technology, such as voltages between 0V and the supply voltage level.

The analog read bit lines 206, also integrated within the 8T-SRAM array 202, collect the weighted current outputs from each column of memory cells. As the analog voltages on the analog word lines 204 are applied, the read transistors are activated within the 2T read path of each memory cell, current flows through the 2T read paths and accumulates in the analog read bit lines 206. This accumulated current ($I_W$) represents the sum of weighted contributions from all activated cells in each column, performing the accumulation portion of the VMM operation. The analog read bit lines 206 may include 128 separate bit lines corresponding to the output dimensions.

A weighted current accumulator (WCA) 208 processes the current signals from the analog read bit lines 206 and performs current accumulation operations to generate the final VMM result. The WCA 208 weights the currents from the analog read bit lines 206 by bit significance, applying scaling factors such as ×1, ×2, ×4, and ×8 to accommodate the 4-bit precision of the stored weights. For the 4-bit weight implementation, the WCA 208 receives multiple current signals from each column corresponding to the bits of weight precision and combines the current signals according to the bit positions of the current signals (×1 for bit 0, ×2 for bit 1, ×4 for bit 2, and ×8 for bit 3). The WCA 208 accumulates these weighted currents to produce an output current ($I_{OUT}$) that represents the completed VMM result. The WCA 208 may implement current summation using analog circuitry that maintains the precision and linearity required for accurate neural network computations. The WCA 208 may include current mirror circuits, current steering networks, or switched-capacitor circuits to perform the bit-weighted accumulation while maintaining signal integrity in the analog domain.

The output current ($I_{OUT}$) from the WCA 208 is provided to the gain circuit 108, which includes specialized analog signal conditioning components configured to maintain continuous analog signal flow throughout the FAST-CIM architecture. A current-to-voltage converter 210 within the gain circuit 108 converts the analog current signal ($I_{OUT}$) to an analog voltage signal while preserving the signal integrity and dynamic range. The current-to-voltage converter 210 may implement a quasi-linear conversion process that operates in the triode region of transistor operation, where the Drain-to-Source voltage ($V_{DS}$) is less than the Gate-to-Source voltage ($V_{GS}$) minus the threshold voltage ($V_{th}$) (i.e., $V_{DS}<V_{GS}-V_{th}$), to provide enhanced linearity and optimize low-power operation. The current-to-voltage converter 210 can include transistors that form a nonlinear resistor operating in the triode region, providing improved linearity compared to conventional current-to-voltage conversion circuits.

A voltage follower output stage 212 within the gain circuit 108 receives the converted voltage signal from the current-to-voltage converter 210 and provides low-impedance analog voltage output suitable for driving subsequent circuit stages. The voltage follower output stage 212 can include multiple transistors that implement a high-precision voltage follower with negative feedback to achieve low output impedance and stable voltage output. The voltage follower output stage 212 may operate according to the gain equation $$R_{of} = \frac{R_o}{(\delta_{ds1} + \delta_{ds2} + A\beta)},$$

where Aβ represents the loop gain of the feedback system. The voltage follower output stage 212 ensures that the analog voltage signals can be transmitted to subsequent processing stages without signal degradation or loading effects.

The gain circuit 108 generates an analog voltage output ($V_{OUT}$) that maintains the processed information from the sequential data patches 104 in analog form for continuous processing by subsequent CIM arrays. The analog voltage output from the gain circuit 108 is provided to the recurrent CIM array 110 for further processing. The continuous analog signal flow enabled by the gain circuit 108 eliminates the need for ADCs and DACs between the feedforward and recurrent processing stages, thereby reducing power consumption and latency compared to traditional CIM implementations that require digital conversion operations.

The feedforward processing circuit 200 of the feedforward CIM array 106 shown in FIG. 2 can enable high-performance VMM operations with compute efficiency of up to 268 TOPS/W and compute density of up to 212 TOPS/mm$^2$ when implemented in 28 nm CMOS technology. The feedforward CIM array 106 can process sequential data patches with minimal latency while maintaining analog signal integrity throughout the computation pipeline. The 8T-SRAM implementation provides separate read and write paths that enable simultaneous weight access during computation and weight updates during training, supporting both inference and learning operations within the same hardware structure.

The feedforward processing circuit 200 of the feedforward CIM array 106 shown in FIG. 2 also supports a LocalVim architecture by providing the necessary feedforward processing capabilities for sequential data patches while maintaining the linear computational complexity that characterizes SSM implementations. The analog signal processing approach eliminates the exponential power scaling associated with larger input sizes in traditional CNN implementations, enabling more scalable neural network architectures suitable for processing high-resolution image data and other complex input formats.

Figure 3:
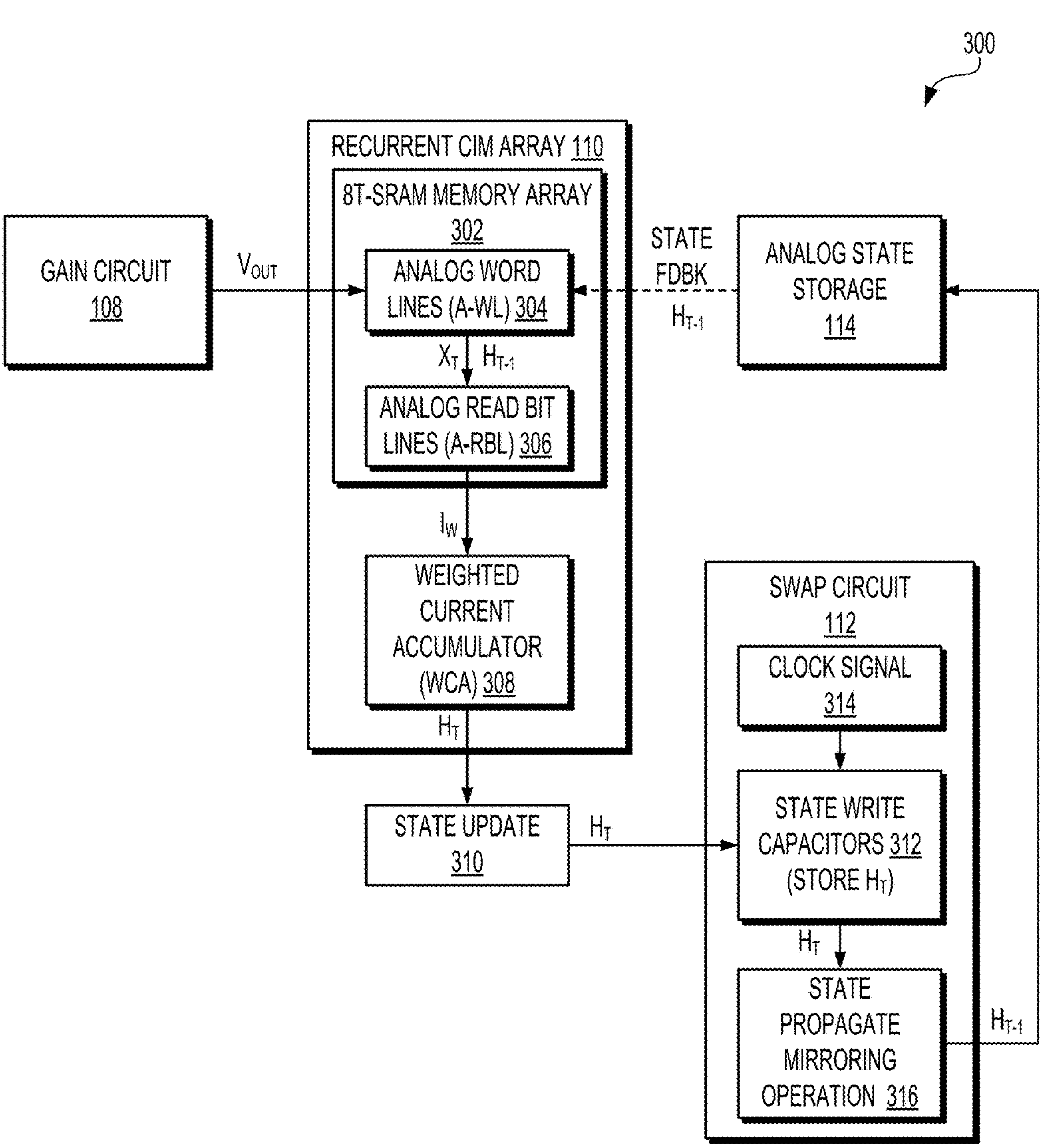
FIG. 3 depicts a detailed circuit diagram of a recurrent CIM array with a State Write And Propagate (SWAP) circuit according to various aspects of the present disclosure.

FIG. 3 depicts a recurrent processing circuit 300 of the recurrent CIM array 110 with the SWAP circuit 112 according to various aspects of the present disclosure. The recurrent processing circuit 300 shown in FIG. 3 illustrates the internal components and signal processing flow within the recurrent CIM array 110 from FIG. 1.

The recurrent CIM array 110 may receive analog voltage as input from the gain circuit 108, which provides the processed output ($V_{OUT}$) from the feedforward CIM array 106. The analog voltage input carries the current input data $X_T$ that has been converted from the sequential data patches 104 and conditioned by the gain circuit 108 for signal integrity and impedance matching. The analog voltage input may maintain the dynamic range and precision necessary for accurate SSM computations while enabling continuous analog signal flow throughout the FAST-CIM architecture.

The recurrent CIM array 110 includes multiple interconnected components that perform SSM computations and state management operations using analog signals. An 8T-SRAM memory array 302 is the primary memory component of the recurrent CIM array 110 and stores weight data in a 256×128 matrix configuration. The 8T-SRAM memory array 302 includes integrated analog word lines (A-WL) 304 and analog read bit lines (A-RBL) 306 as shown within the array structure in FIG. 3. Multiply-accumulate (MAC) operations occur directly within the 8T-SRAM memory array 302 through the interaction of input voltages on the analog word lines 304 with stored weights, generating weighted currents in the analog read bit lines 306. The 8T-SRAM memory array 302 may store 4-bit precision weight values that represent the learned parameters for both the recurrent state matrix A and the input matrix B in the SSM equations $h_{t+1}=A_d \cdot h_t+B_d \cdot x_t$ and the output given by $y_t=C \cdot h_t$ (C: output projection matrix). The larger matrix dimension of 256×128 compared to the feedforward CIM array 106 accommodates the computational requirements of SSM operations that process both current input data $x_t$ and previous state data $h_{t-1}$ simultaneously. The 8T-SRAM memory array 302 implements memory cells with separate read paths and write paths, enabling concurrent weight access during computation and weight updates during training operations.

The analog word lines 304, integrated within the 8T-SRAM memory array 302, receive dual input signals including the current input data $x_t$ from the gain circuit 108 and the previous state $h_{t-1}$ from the feedback loop ("STATE FDBK"), and apply these analog voltage signals to the 8T-SRAM memory array 302. The analog word lines 304 operate by applying both $x_t$ and $h_{t-1}$ voltage components to activate the read transistors within the memory cells, enabling the stored weight values to influence the current flow through the memory cells according to the SSM computations. The analog word lines 304 may include separate sets of word lines corresponding to the current input dimensions and the previous state dimensions, where each word line carries a specific analog voltage level. The dual input capability of the analog word lines 304 enables the recurrent CIM array 110 to perform the linear combination operations required by the SSM equations $h_p(i)=A \cdot h_p(i-1)+B \cdot x_p(i)$, where A and B represent the stored weight matrices, $h_p(i-1)$ represents the previous state, and $x_p(i)$ represents the current input.

The analog read bit lines 306, also integrated within the 8T-SRAM memory array 302, collect the weighted current outputs from the 8T-SRAM memory array 302 and generate current signals ($I_W$) that represent the weighted contributions from each memory cell processing both the current input and previous state information. The analog read bit lines 306 operate along the 2T read path of the memory cells, where multiplication occurs through the interaction between the analog voltages on the word lines and the stored conductance values in the memory cells. The resulting current accumulated in the analog read bit lines 306 represents the partial products of the SSM computations and provides the foundation for generating the updated state information. The analog read bit lines 306 may include 128 separate bit lines corresponding to the state dimensions, where each bit line accumulates current from the respective column of memory cells in the 8T-SRAM memory array 302.

A weighted current accumulator (WCA) 308 processes the current signals ($I_W$) from the analog read bit lines 306 within the 8T-SRAM memory array 302. The WCA 308 performs current accumulation operations similar to the WCA 208 in the feedforward CIM array 106 (see FIG. 2), combining the weighted currents that represent both the recurrent state contributions ($A_d \cdot h_{t-1}$) and the input contributions ($B \cdot x_t$). The WCA 308 weights the currents by bit significance for the 4-bit precision implementation and generates the updated state information $h_t$ as its output. The MAC operations inherent to the recurrent CIM array 110, combined with the WCA 308 accumulation, complete the SSM equation computations equations $h_{t+1}=A_d \cdot h_t+B_d \cdot x_t$. Output of the recurrent CIM array 110 includes a state update 310 that represents the computed state $h_t$ from the WCA 308. The WCA 308 provides the state update 310 to the SWAP circuit 112 for storage and propagation operations.

The SWAP circuit 112 implements state write and propagate functionality that manages the storage and feedback of state information in analog form, eliminating the need for digital state storage that would be required in traditional recurrent neural network implementations. A clock signal 314 provides synchronization for the SWAP circuit 112 operations, ensuring that state updates occur at the proper timing intervals and maintaining temporal coherence in the SSM computations. The clock signal 314 may operate at frequencies suitable for the processing requirements of the state-SSM, such as frequencies in the range of 1-2.5 GHz depending on the specific implementation and performance requirements.

State write capacitors 312 receive the updated state information $h_t$ from the state update 310 and store this information in analog form using capacitive storage elements. The state write capacitors 312 operate under control of the clock signal 314 to ensure synchronized storage of the state information. The state write capacitors 312 may implement analog storage using capacitive elements that maintain the voltage levels representing the state information for the duration required between sequential processing operations. The capacitive storage approach enables the SWAP circuit 112 to retain state information in analog form without requiring analog-to-digital conversion operations that would introduce power overhead and latency.

A state propagate mirroring 316 receives the stored state information from the state write capacitors 312 and generates the feedback signal $h_{t-1}$ that is provided back to the analog word lines 304 for use in subsequent SSM computations. The state propagate mirroring 316 implements voltage mirroring functionality using transistor circuits that create an accurate copy of the stored state voltage while maintaining the original stored value for future processing cycles. The mirroring operation can use matched transistors or current mirror configurations to ensure that the feedback signal $h_{t-1}$ accurately represents the stored state information without signal degradation or loading effects. The state propagate mirroring 316 enables the recurrent CIM array 110 to maintain temporal dependencies between processing cycles, providing the feedback mechanism essential for state-space model computations.

Analog state storage 114 provides extended storage capability for the state information, maintaining the analog voltage levels for the duration Δt between state updates to ensure continuity in state evolution. The analog state storage 114 may implement additional capacitive storage elements or other analog memory techniques to maintain state information over longer time periods when required by the specific SSM implementation. The duration Δt represents the time interval between sequential patch processing operations and can be adjusted based on the processing requirements and temporal characteristics of the input data.

The recurrent CIM array 110 shown in FIG. 3 enables the implementation of SSMs with linear computational complexity in both time and space, providing significant advantages over traditional recurrent neural network architectures that exhibit quadratic complexity scaling. The analog signal processing approach maintains continuous signal flow throughout the state computation and update operations, eliminating the power overhead associated with digital conversion operations between processing stages. The SWAP circuit 112 enables efficient state management in the analog domain, supporting the temporal processing requirements of SSMs while maintaining the performance benefits of analog computation.

The circuit design shown in FIG. 3 supports the LocalVim architecture by providing the necessary recurrent processing capabilities for sequential data patches while implementing the state transitions described by the discrete-time equations $h_{t+1}=A_d \cdot h_t+B_d \cdot x_t$. The LocalVim architecture can achieve processing latencies as low as 13.8 nanoseconds, representing significant performance improvements compared to traditional digital implementations. The analog state management approach enables the system to process sequential patches with minimal memory requirements and power consumption, supporting the scalable neural network architectures enabled by SSM formulations.

Figure 4:
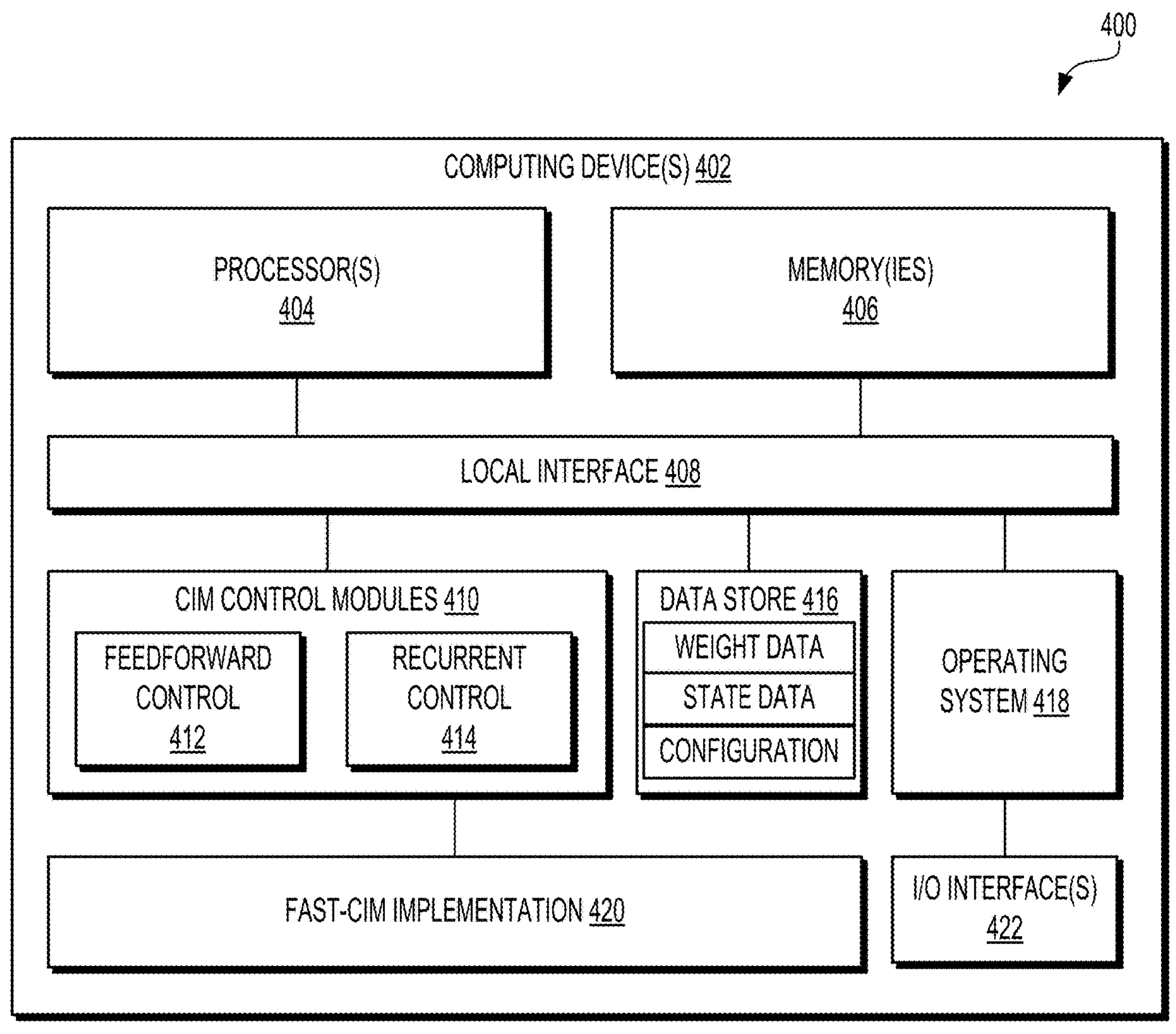
FIG. 4 depicts a schematic block diagram of a computing environment in which the analog CIM architecture can be implemented according to various aspects of the present disclosure.

FIG. 4 depicts a schematic block diagram of a computing environment 400 in which the analog CIM architecture for SSM neural networks can be implemented according to various aspects of the present disclosure. The computing environment 400 provides the hardware and software infrastructure within which FAST-CIM processing operations as described with reference to FIGS. 1-3 can be implemented.

The computing environment 400 includes one or more computing devices 402. Each computing device 402 may include one or more server computers, workstations, personal computers, embedded systems, field-programmable gate arrays (FPGAs), application-specific integrated circuits (ASICs), system-on-chip (SoC) devices, or other computing platforms capable of implementing the FAST-CIM architecture. The computing device 402 may provide the computational infrastructure for implementing the analog CIM arrays and associated control logic.

One or more processors 404 are included within the computing device 402. The processors 404 may include central processing units (CPUs), graphics processing units (GPUs), neural processing units (NPUs), digital signal processors (DSPs), or other processing elements capable of executing instructions and coordinating the FAST-CIM operations. The processors 404 may execute control logic for managing the analog CIM arrays, coordinating data flow between components, and interfacing with external systems. In some implementations, the processors 404 may include specialized hardware accelerators designed to support the FAST-CIM architecture.

One or more memories 406 are coupled to the processors 404 through a local interface 408. The memories 406 may include volatile memory such as dynamic random access memory (DRAM) or static random access memory (SRAM), as well as non-volatile memory such as flash memory, solid-state drives (SSDs), or other persistent storage. The memories 406 store program instructions, configuration data, and temporary data used during FAST-CIM operations. The memories 406 may also buffer the input data 102 and output data 118 during processing operations.

The local interface 408 facilitates communication between components within the computing device 402. The local interface 408 may include one or more buses, interconnects, or communication fabrics such as Advanced extensible Interface (AXI), Peripheral Component Interconnect Express (PCIe), or other suitable interconnection technologies. The local interface 408 enables high-bandwidth, low-latency communication between the processors 404, memories 406, and other components to support real-time FAST-CIM processing requirements.

CIM control modules 410 are coupled to the local interface 408 and provide specialized control functions for the FAST-CIM architecture. The CIM control modules 410 may include software and/or hardware components that manage the operation of the analog CIM arrays, coordinate data flow, and implement the SSM computations. For example, the CIM control modules 410 may include a feedforward control module 412 and a recurrent control module 414.

The feedforward control module 412 manages the operation of the feedforward CIM array 106 described with reference to FIGS. 1 and 2. The feedforward control module 412 may control the application of input voltages to the analog word lines 204, manages the WCA 208 operations, and coordinates with the gain circuit 108 to maintain analog signal continuity. The feedforward control module 412 may include digital control logic, timing generators, voltage reference circuits, and interface components necessary to operate the feedforward CIM array 106.

The recurrent control module 414 may manage the operation of the recurrent CIM array 110 described with reference to FIGS. 1 and 3. The recurrent control module 414 may control the dual-input operations on the analog word lines 304, manages the state update mechanisms, and coordinates with the SWAP circuit 112 to maintain analog state storage and feedback. The recurrent control module 414 may implement the timing and control sequences necessary for executing the SSM equations in the analog domain.

A data store 416 is coupled to the local interface 408 and stores persistent data used by the FAST-CIM implementation. The data store 416 may store weight data that represents the trained neural network parameters loaded into the 8T-SRAM memory arrays 202, 302. The weight data may include 4-bit precision values organized according to the matrix configurations of the feedforward and recurrent CIM arrays. The data store 416 may store state data that represents saved state information from previous processing sessions or checkpoints. The data store 416 may store configuration data, including parameters such as array dimensions, voltage levels, timing parameters, and other operational settings for the FAST-CIM architecture.

An operating system 418 executes on the processors 404 and provides system-level services for the FAST-CIM implementation. The operating system 418 may include a real-time operating system (RTOS), Linux®, Windows®, or other suitable operating system that supports the computational requirements of the FAST-CIM architecture. The operating system 418 manages system resources, schedules tasks, handles interrupts, and provides interfaces for application software.

The FAST-CIM implementation 420 may represent the core neural network processing functionality implemented using the CIM arrays. The FAST-CIM implementation 420 may include a combination of hardware components (such as the physical CIM arrays, gain circuits, and SWAP circuits) and software components (such as control algorithms, data management routines, and interface protocols). The FAST-CIM implementation 420 may execute the neural network computations described with reference to FIGS. 1-3, processing sequential data patches through the analog CIM arrays while maintaining continuous analog signal flow.

One or more input/output (I/O) interfaces 422 provide connectivity between the computing device 402 and external systems or devices. The I/O interfaces 422 may include network interfaces (such as Ethernet, WI-FI, or InfiniBand), storage interfaces (such as Serial Advanced Technology Attachment (SATA), Non-Volatile Memory Express (NVMe), or Small Computer System Interface (SCSI), display interfaces (such as High-Definition Multimedia Interface (HDMI) or DisplayPort), and other communication interfaces. The I/O interfaces 422 enable the computing device 402 to receive input data for processing and transmit output data to external systems or storage devices.

The computing environment 400 may be scaled to support different application requirements. For edge computing applications, the computing device 402 may be implemented as a compact, low-power system with integrated CIM arrays. For data center applications, multiple computing devices 402 may be networked together to process larger models or higher data throughput. The modular architecture enables flexible deployment across various computing platforms while maintaining the performance benefits of the FAST-CIM approach.

Figure 5:
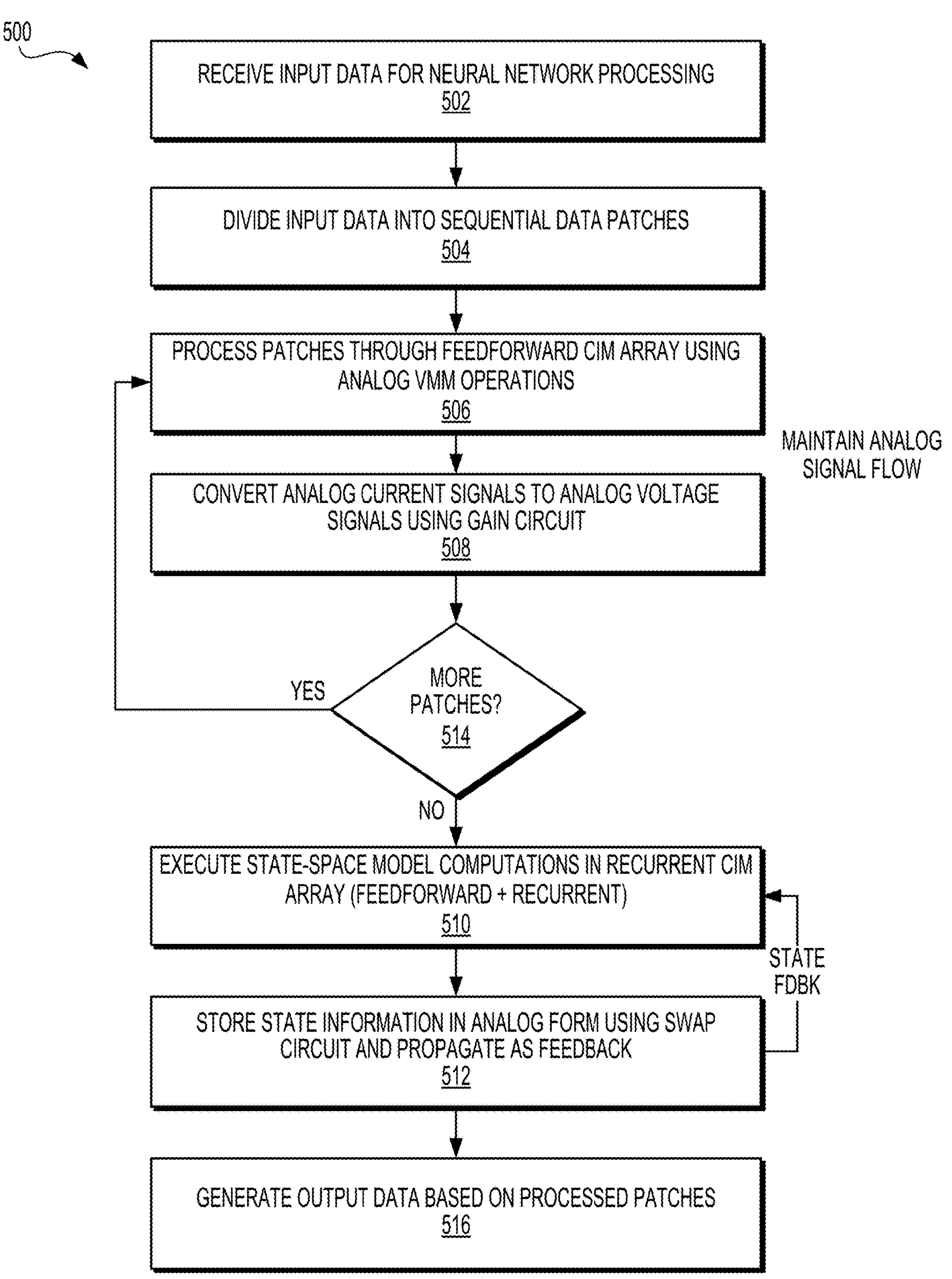
FIG. 5 depicts a flowchart of an example method for processing neural network data using the analog CIM architecture according to various aspects of the present disclosure.

FIG. 5 depicts a flowchart illustrating an example method 500 for processing neural network data using the analog CIM architecture according to various aspects of the present disclosure. The method 500 implements the FAST-CIM processing operations described with reference to FIGS. 1-3 and demonstrates the continuous analog signal flow maintained throughout the computational pipeline. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

At block 502, the method 500 includes receiving input data for neural network processing. The input data may include image data, video data, sensor data, time-series data, or other types of multi-dimensional information suitable for processing using SSMs. For image classification tasks, the input data may include ImageNet-1K images containing over 1.2 million images spanning 1,000 classes, or CIFAR-10 images containing 60,000 32×32 color images across 10 classes. The input data is received through the I/O interfaces 422 of the computing device 402 and may be temporarily stored in the memories 406 for processing.

At block 504, the method 500 includes dividing the input data into sequential data patches. When the input data includes image data, the division process partitions the image into patches having predetermined spatial dimensions. For example, the input image may be divided into 16×16×3 patches, where the dimensions indicate 16×16 pixels with 3 color channels (red, green, blue). The number of patches generated depends on the input image size and the selected patch dimensions. For ImageNet-1K processing, up to 196 sequential data patches may be generated, while CIFAR-10 processing may utilize 4 sequential data patches. The sequential data patches enable the LocalVim architecture to process large images efficiently by operating on smaller, manageable portions while maintaining temporal relationships between patches.

At block 506, the method 500 includes processing patches through a feedforward CIM array using analog vector-matrix multiplication (VMM) operations. Each sequential data patch is converted to analog voltage signals and applied to the analog word lines 204 of the feedforward CIM array 106. The feedforward CIM array 106 performs the VMM operation $y_{out}=W^T \cdot v_{in}$, where W represents the stored weight matrix in the 8T-SRAM memory array 202, $v_{in}$ represents the input voltage vector derived from the current patch, and $y_{out}$ represents the output current vector. The analog computations occur directly within the memory cells along the 2T read paths, with the resulting currents accumulated in the analog read bit lines 206. The WCA 208 weights and accumulates these currents according to bit significance to produce the final VMM result as an analog current signal ($I_{OUT}$).

The method 500 maintains analog signal flow between processing stages, as indicated by the label "MAINTAIN ANALOG SIGNAL FLOW" between blocks 506 and 508. This continuous analog processing eliminates the need for analog-to-digital converters (ADCs) and digital-to-analog converters (DACs) between computational layers, significantly reducing power consumption and latency compared to traditional CIM implementations.

At block 508, the method 500 includes converting analog current signals to analog voltage signals using a gain circuit. The gain circuit 108 receives the analog current output $I_{OUT}$ from the feedforward CIM array 106 and performs current-to-voltage conversion while maintaining signal integrity. The current-to-voltage converter 210 within the gain circuit 108 implements quasi-linear conversion using transistors operating in the triode region ($V_{DS}<V_{GS}-V_{th}$) to enhance linearity. This provides a low-impedance analog voltage output $V_{OUT}$ suitable for driving subsequent processing stages. The gain circuit 108 ensures stable voltage levels and proper impedance matching for continuous analog signal propagation.

At decision block 514, the method 500 determines whether more patches remain to be processed through the feedforward CIM array. The CIM control modules 410 track the number of patches processed and compare this count to the total number of patches generated at block 504. If additional patches remain (YES branch), the method 500 returns to block 506 to process the next sequential data patch through the feedforward CIM array 106. This loop continues until all sequential data patches have been processed through the feedforward stage. If no additional patches remain (NO branch), the method 500 proceeds to block 510 for state-space model computations.

At block 510, the method 500 includes executing state-space model computations in a recurrent CIM array, performing both feedforward and recurrent operations. The recurrent CIM array 110 may receive the processed patch data as analog voltage signals from the gain circuit 108. The recurrent CIM array 110 implements the SSM update equation $h_{t+1}=A_d \cdot h_t+B_d \cdot x_t$, where $h_t$ represents the hidden state, $x_t$ represents the current input, and $h_{t+1}$ represents the updated state. The complete SSM formulation further includes the output equation $y_t=C \cdot h_t$, which can be implemented using the feedforward CIM array 106 operations to generate the final output from the updated state. The analog word lines 304 receive dual inputs including the current input data $x_t$ from the gain circuit 108 and the previous state $h_{t-1}$ from the feedback loop. The 8T-SRAM memory array 302 stores weight matrices A and B in a 256×128 configuration. The multiply-accumulate operation 308 performs the linear combination $A_d \cdot h_t+B_d \cdot x_t$ to generate the updated state $h_t$. The recurrent operations update state information based on both previous state data and current input data, implementing the temporal dynamics characteristic of SSMs.

A state feedback path (labeled "STATE FDBK") provides continuous feedback from block 512 to block 510, enabling the recurrent CIM array 110 to access previous state information for subsequent computations. This feedback mechanism is used to maintain the temporal dependencies in the SSM.

At block 512, the method 500 includes storing state information in analog form using a SWAP circuit and propagating the state as feedback. The SWAP circuit 112 may receive the updated state $h_t$ from the state update 310 and may implement SWAP functionality. Under control of the clock signal 314, the state write capacitors 312 store the updated state information in analog form using capacitive storage elements. The state propagate mirroring operation 316 creates an accurate copy of the stored state voltage and provides this as the feedback signal $h_{t-1}$ to the recurrent CIM array 110. The analog state storage 114 maintains the state information for the duration Δt between sequential processing operations. This analog state storage eliminates the need for digital registers and analog-to-digital conversion operations that would be required in traditional implementations.

At block 516, the method 500 includes generating output data based on the processed patches. After all sequential data patches have been processed through both the feedforward and recurrent CIM arrays, the output data generation module 116 produces the final neural network output. For classification tasks, the output data generation module 116 implements a task head that performs classification operations on the temporally combined features. The output data 118 may include classification results, detection outputs, or other processed information depending on the specific neural network application. The method 500 may achieve classification accuracies of up to 74.3% for ImageNet-1K datasets and 96.29% for CIFAR-10 datasets when implementing the LocalVim-T architecture.

The method 500 shown in FIG. 5 demonstrates the key operational principles of the FAST-CIM architecture, including continuous analog signal flow, sequential patch processing, state-space model computations in the analog domain, and analog state storage with feedback. The method 500 may eliminate the power overhead associated with repeated analog-to-digital conversions between layers, achieving compute efficiency of up to 268 TOPS/W and reducing total power consumption by approximately 70% compared to traditional ACIM implementations with digitization. The processing latency for the complete method may be as low as 13.8 nanoseconds for a LocalVim block, compared to 65 nanoseconds for ACIM-Dig implementations and 468 nanoseconds for fully digital implementations.

Figure 6A:
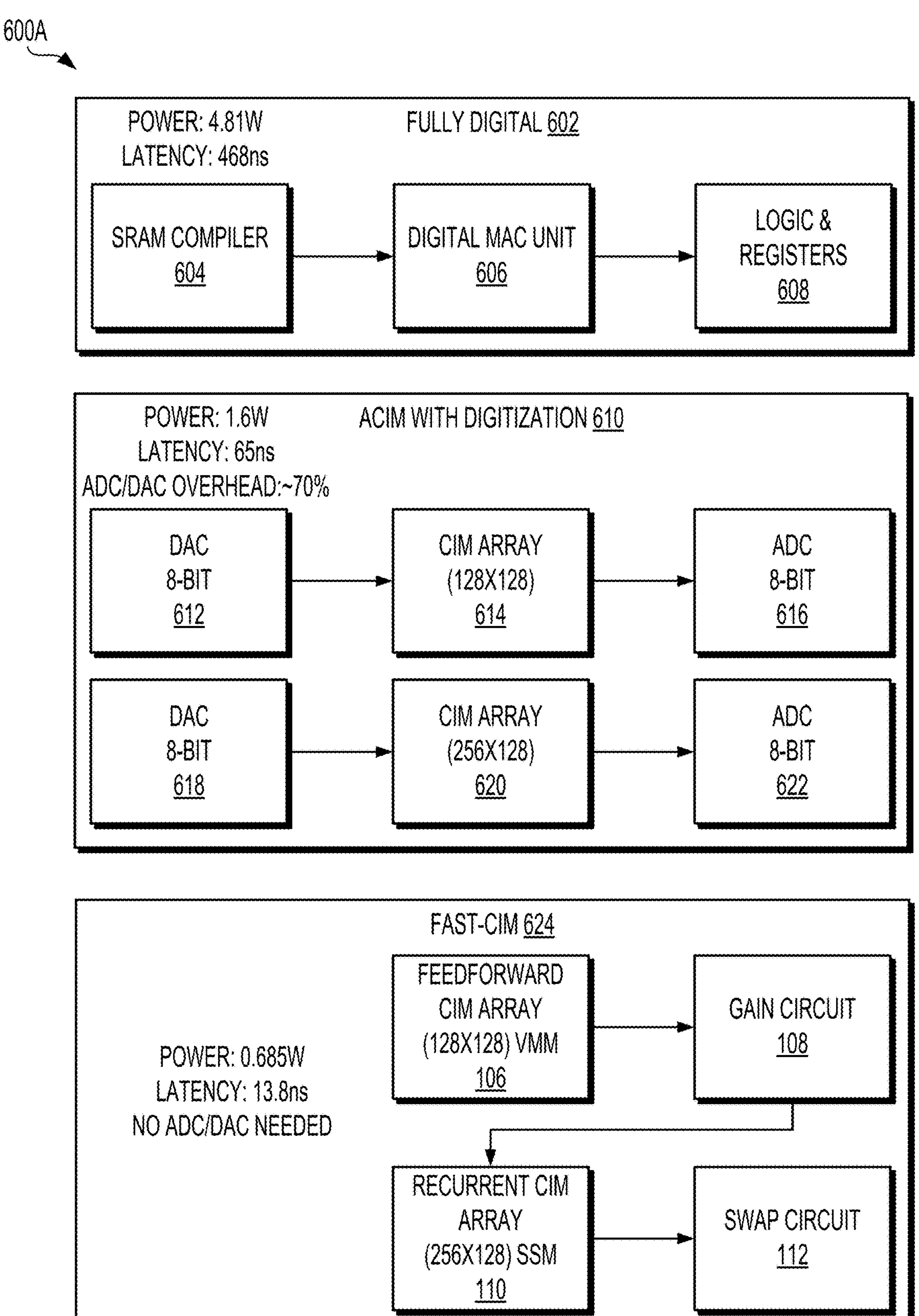
FIG. 6A depicts architectural block diagrams comparing fully digital, analog CIM with digitization, and Fully Analog STate-Space CIM (FAST-CIM) implementations according to various aspects of the present disclosure.

FIG. 6A depicts architectural block diagrams comparing three different CIM implementations for neural network processing according to various aspects of the present disclosure. The architectural comparison 600A illustrates the fundamental differences in signal processing approaches and component requirements between fully digital, analog CIM with digitization, and the FAST-CIM architectures.

The fully digital architecture 602 represents a conventional digital neural network processing approach. The fully digital architecture 602 includes a SRAM compiler 604 that stores neural network weights in traditional digital memory format. The SRAM compiler 604 may provide weight data to a digital multiply-and-accumulate (MAC) unit 606, which performs vector-matrix multiplication operations using digital arithmetic logic. The digital MAC unit 606 may process data through sequential arithmetic operations, requiring multiple clock cycles for each computation. Logic and registers 608 store intermediate results and maintain state information between computational steps. The fully digital architecture 602 may exhibit power consumption of 4.81 W and latency of 468 nanoseconds (ns), as indicated by the performance metrics. The high power consumption results from continuous data movement between the SRAM compiler 604 and the digital MAC unit 606, exemplifying the von Neumann bottleneck that limits traditional digital architectures. The comparison is based on executing the complete LocalVim state-space model implementation with cascaded layers as described above, and the architectural comparison 600A illustrates the fundamental differences in signal processing approaches and component requirements between fully digital, analog CIM with digitization, and FAST-CIM architectures when implementing the full LocalVim neural network model.

The ACIM-Dig architecture 610 represents a hybrid approach that performs analog computations within memory arrays but requires digital interfaces between processing stages. The ACIM-Dig architecture 610 includes multiple processing layers, each requiring analog-to-digital and digital-to-analog conversion.

In the first layer, a DAC 612 converts 8-bit digital input data to analog signals. The DAC 612 provides analog signals to a CIM array 614 having dimensions of 128×128 memory cells. The CIM array 614 performs analog vector-matrix multiplication directly within the memory array, leveraging the physical properties of memory cells to compute in parallel. An ADC 616 converts the analog computation results back to 8-bit digital format for transfer to the next processing stage.

The second layer includes another DAC 618 that converts the digital data from the previous stage back to analog format. A larger CIM array 620 with dimensions of 256×128 processes the analog signals for recurrent computations. Another ADC 622 converts the analog results to digital format. The ACIM-Dig architecture 610 demonstrates the overhead associated with repeated analog-digital conversions, with ADC/DAC components contributing approximately 70% overhead to the total power consumption. The ACIM-Dig architecture 610 exhibits power consumption of 1.6 W and latency of 65 ns, showing improvement over the fully digital approach but still incurring significant overhead from the conversion operations.

The FAST-CIM architecture 624 represents an example implementation described in the present disclosure, which maintains continuous analog signal flow throughout the computational pipeline. The FAST-CIM architecture 624 includes a feedforward CIM array 106 with dimensions of 128×128 that performs vector-matrix multiplication (VMM) operations directly on analog input signals. The feedforward CIM array 106 processes sequential data patches as described with reference to FIGS. 1 and 2, generating analog current outputs without requiring digital conversion.

A gain circuit 108 receives the analog current output from the feedforward CIM array 106 and converts the current signals to voltage signals while maintaining analog continuity. The gain circuit 108 implements quasi-linear current-to-voltage conversion and voltage follower functionality as described with reference to FIG. 2, ensuring proper signal conditioning for subsequent processing stages.

A recurrent CIM array 110 with dimensions of 256×128 receives the analog voltage signals from the gain circuit 108 and performs SSM computations. The recurrent CIM array 110 implements the SSM equations for state updates, processing both current input data and previous state information in the analog domain as described with reference to FIGS. 1 and 3.

A SWAP circuit 112 manages analog state storage and feedback operations, storing state information in capacitive elements and providing state feedback to the recurrent CIM array 110 without digital conversion. The SWAP circuit 112 enables the maintenance of temporal dependencies required for SSM computations while preserving analog signal integrity.

The FAST-CIM architecture 624 achieves power consumption of only 0.685 W and latency of 13.8 ns by eliminating ADC/DAC components between processing stages. The "NO ADC/DAC NEEDED" characteristic represents a fundamental advantage of the FAST-CIM approach, enabling continuous analog processing from input to output.

As shown in FIG. 6A, the ACIM-Dig architecture 610 cannot cascade the CIM arrays 614, 620 without the intervening DAC 618 and ADC 616, 622 components. In contrast, the FAST-CIM architecture 624 demonstrates direct cascading from the feedforward CIM array 106 to the recurrent CIM array 110 with only the analog gain circuit 108 positioned therebetween.

FIG. 6B depicts a performance comparison table 600B that quantifies the advantages of the FAST-CIM architecture relative to the fully digital and ACIM-Dig implementations according to various aspects of the present disclosure. The performance comparison table 600B presents key metrics that demonstrate the technical improvements achieved through continuous analog processing.

The area metric shows the silicon area requirements for each architecture when implemented in 28 nm CMOS technology. The fully digital architecture requires 4.9 square millimeters ($mm^2$), including area for the SRAM compiler, digital MAC units, and associated logic. The ACIM-Dig architecture requires 4.5 $mm^2$ despite the addition of ADC and DAC components, benefiting from the compact nature of analog CIM arrays compared to digital MAC units. The FAST-CIM architecture achieves the smallest area of 4.11 $mm^2$, representing a 16% reduction compared to the fully digital approach and a 9% reduction compared to ACIM-Dig. The area savings result from eliminating ADC/DAC components and associated digital logic while maintaining compact analog CIM arrays.

The power metric demonstrates the most significant advantage of the FAST-CIM architecture. The fully digital architecture consumes 4.81 W due to continuous data movement and digital arithmetic operations. The ACIM-Dig architecture reduces power to 1.6 W by performing computations within memory arrays, but still incurs substantial overhead from ADC/DAC operations. The FAST-CIM architecture achieves power consumption of only 0.685 W, representing an 86% reduction compared to the fully digital approach and a 57% reduction compared to ACIM-Dig. The dramatic power reduction results from eliminating analogto-digital conversion operations that contribute approximately 70% of the power consumption in ACIM-Dig implementations.

The latency metric measures the time required to process data through each architecture. The fully digital architecture exhibits latency of 468 ns due to sequential digital operations and memory access delays. The ACIM-Dig architecture reduces latency to 65 ns through parallel analog computations, though conversion operations still contribute significant delay. The FAST-CIM architecture achieves latency of only 13.8 ns, representing a 97% reduction compared to the fully digital approach and a 79% reduction compared to ACIM-Dig. The ultra-low latency enables real-time processing of neural network computations for time-critical applications.

The efficiency metric, measured in tera operations per second per watt (TOPS/W), quantifies the computational efficiency of each architecture. The fully digital architecture does not achieve measurable TOPS/W efficiency due to its high power consumption relative to computational throughput. The ACIM-Dig architecture achieves 20.6-39.6 TOPS/W depending on the specific implementation and workload. The FAST-CIM architecture 100 achieves 268 TOPS/W, representing a 6.8× to 13× improvement over ACIM-Dig implementations. The exceptional efficiency results from the combination of reduced power consumption and maintained computational throughput through continuous analog processing.

The performance comparison illustrated in FIGS. 6A and 6B demonstrates that the FAST-CIM architecture achieves superior metrics across several parameters, including area, power, latency, and efficiency, by maintaining analog signal continuity throughout the computational pipeline and eliminating the overhead associated with repeated analog-to-digital conversions in traditional CIM implementations.

The present disclosure provides a fundamentally new approach to neural network acceleration by integrating SSMs with a FAST-CIM architecture to eliminate the analog-to-digital conversion overhead that constrains existing CIM implementations. The FAST-CIM architecture achieves continuous analog signal flow from input to output through novel circuit components including a gain circuit for analog current-to-voltage conversion and a SWAP circuit for analog state storage and propagation, enabling end-to-end analog processing without intermediate digitization. By leveraging the architectural alignment between SSMs and CIM, specifically the consistent feature map sizes, linear computational complexity, and reduced intermediate storage requirements of SSMs, the disclosed system can achieve up to 268 TOPS/W computational efficiency and 13.8 ns processing latency in some implementations, representing substantial improvements over both fully digital architectures and hybrid analog-digital CIM approaches. The combination of algorithmic innovation (SSMs) with circuit-level optimization (continuous analog processing) enables scalable neural network implementations that maintain high accuracy while dramatically reducing power consumption, making practical a new class of ultra-efficient neural network accelerators for edge computing, real-time processing, and large-scale data center applications.

The features, structures, or characteristics described above may be combined in one or more implementations in any suitable manner, and the features discussed in the various implementations are interchangeable, if possible. In the following description, numerous specific details are provided in order to fully understand the implementations of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described implementations of the present disclosure are merely possible examples set forth for a clear understanding of the principles of the disclosure. Many variations and modifications may be made to the above-described implementations without departing substantially from the spirit and principles of the disclosure. All such modifications and variations are intended to be included herein within the scope of this disclosure and protected by the following claims.

What is claimed is:

1. A system, comprising:

at least one computing device; and computer-executable instructions that, when executed by the at least one computing device, cause the at least one computing device to at least:

receive input data for neural network processing;

divide the input data into a plurality of sequential data patches;

process the plurality of sequential data patches through a feedforward compute-in-memory (CIM) array and a recurrent CIM array arranged in a cascaded configuration, wherein each of the feedforward CIM array and the recurrent CIM array performs vector-matrix multiplication operations using analog computations directly within memory cells;

maintain analog signal flow from the feedforward CIM array through a gain circuit to the recurrent CIM array during processing of the plurality of sequential data patches, wherein the gain circuit converts analog current signals from the feedforward CIM array to analog voltage signals provided to the recurrent CIM array;

perform state-space model computations on the plurality of sequential data patches, wherein the state-space model computations comprise feedforward operations performed by the feedforward CIM array and recurrent operations performed by the recurrent CIM array that update state information based at least in part on previous state data and current input data;

store, using a state management circuit, the state information in analog form within an analog state storage between sequential processing operations, wherein the state management circuit writes updated state information and propagates the updated state information as feedback to the recurrent CIM array; and generate output data based at least in part on the processed plurality of sequential data patches.

2. The system of claim 1, wherein the feedforward CIM array has a first matrix dimension configuration and the recurrent CIM array has a second matrix dimension configuration different from the first matrix dimension configuration.

3. The system of claim 1, wherein the gain circuit comprises one or more quasi-linear conversion elements that operate in a triode region for enhanced linearity.

4. The system of claim 1, wherein the state-space model computations implement a vision architecture that uses structured state-space models to process the plurality of sequential data patches through the feedforward CIM array and the recurrent CIM array.

5. The system of claim 4, wherein the feedforward CIM array and the recurrent CIM array process the plurality of sequential data patches in multiple scanning directions and apply one or more spatial and channel attention operations to the plurality of sequential data patches.

6. The system of claim 1, wherein the state management circuit comprises one or more state write capacitors that store the updated state information in analog form and one or more mirroring circuits that propagate the updated state information as the feedback to the recurrent CIM array.

7. A computer-implemented method, comprising:

receiving input data for neural network processing;

dividing the input data into a plurality of sequential data patches;

processing the plurality of sequential data patches through a feedforward compute-in-memory (CIM) array and a recurrent CIM array arranged in a cascaded configuration, wherein each of the feedforward CIM array and the recurrent CIM array performs vector-matrix multiplication operations using analog computations directly within memory cells;

maintaining analog signal flow from the feedforward CIM array through a gain circuit to the recurrent CIM array during processing of the plurality of sequential data patches, wherein the gain circuit converts analog current signals from the feedforward CIM array to analog voltage signals provided to the recurrent CIM array;

performing state-space model computations on the plurality of sequential data patches, wherein the state-space model computations comprise feedforward operations performed by the feedforward CIM array and recurrent operations performed by the recurrent CIM array that update state information based at least in part on previous state data and current input data;

storing, using a state management circuit, the state information in analog form within an analog state storage between sequential processing operations, wherein the state management circuit writes updated state information and propagates the updated state information as feedback to the recurrent CIM array; and generating output data based at least in part on the processed plurality of sequential data patches.

8. The computer-implemented method of claim 7, wherein maintaining analog signal flow from the feedforward CIM array through the gain circuit to the recurrent CIM array comprises converting the analog current signals to the analog voltage signals and providing the analog voltage signals directly to subsequent CIM operations.

9. The computer-implemented method of claim 8, wherein converting the analog current signals to the analog voltage signals comprises applying the analog current signals to the gain circuit comprising one or more quasi-linear current-to-voltage conversion circuits.

10. The computer-implemented method of claim 7, wherein storing the state information in analog form comprises:

storing the updated state information using one or more state write capacitors of the state management circuit; and propagating the updated state information using one or more mirroring circuits.

11. The computer-implemented method of claim 7, wherein executing the state-space model computations comprises implementing a vision architecture that uses structured state-space models to process the plurality of sequential data patches through the feedforward CIM array and the recurrent CIM array.

12. The computer-implemented method of claim 11, wherein processing through the feedforward CIM array and the recurrent CIM array comprises scanning the plurality of sequential data patches in multiple directions and applying one or more spatial and channel attention operations to the plurality of sequential data patches.

13. The computer-implemented method of claim 7, wherein the input data comprises image data, and wherein dividing the input data into the plurality of sequential data patches comprises partitioning the image data into a plurality of patches each having predetermined spatial dimensions.

14. A non-transitory computer-readable medium having instructions stored thereon that, when executed by a computing device, cause the computing device to perform operations comprising:

receiving input data for neural network processing;

dividing the input data into a plurality of sequential data patches;

processing the plurality of sequential data patches through a feedforward compute-in-memory (CIM) array and a recurrent CIM array arranged in a cascaded configuration, wherein each of the feedforward CIM array and the recurrent CIM array performs vector-matrix multiplication operations using analog computations directly within memory cells;

maintaining analog signal flow from the feedforward CIM array through a gain circuit to the recurrent CIM array during processing of the plurality of sequential data patches, wherein the gain circuit converts analog current signals from the feedforward CIM array to analog voltage signals provided to the recurrent CIM array;

performing state-space model computations on the plurality of sequential data patches, wherein the state-space model computations comprise feedforward operations performed by the feedforward CIM array and recurrent operations performed by the recurrent CIM array that update state information based at least in part on previous state data and current input data;

storing, using a state management circuit, the state information in analog form within an analog state storage between sequential processing operations, wherein the state management circuit writes updated state information and propagates the updated state information as feedback to the recurrent CIM array; and generating output data based at least in part on the processed plurality of sequential data patches.

15. The non-transitory computer-readable medium of claim 14, wherein maintaining analog signal flow from the feedforward CIM array through the gain circuit to the recurrent CIM array comprises converting the analog current signals to the analog voltage signals and providing the analog voltage signals directly to subsequent CIM operations.

16. The non-transitory computer-readable medium of claim 14, wherein storing the state information in analog form comprises:

storing the updated state information using one or more state write capacitors of the state management circuit; and propagating the updated state information using one or more mirroring circuits.

17. The non-transitory computer-readable medium of claim 14, wherein the input data comprises image data.

18. The non-transitory computer-readable medium of claim 17, wherein dividing the input data into the plurality of sequential data patches comprises partitioning the image data into a plurality of patches each having predetermined spatial dimensions.

* * * * *